United States Patent [19]

Bommart

[11] 4,275,499
[45] Jun. 30, 1981

[54] APPARATUS FOR REMOVING THE SURPLUS WELDING MATERIAL

[75] Inventor: Patrick Bommart, Rueil Malmaison, France

[73] Assignee: C. Delachaux, France

[21] Appl. No.: 64,544

[22] Filed: Aug. 8, 1979

[30] Foreign Application Priority Data

Aug. 9, 1978 [FR] France ................................ 78 23448

[51] Int. Cl.³ ........................... B23D 1/08; B26D 3/08
[52] U.S. Cl. ......................................... 30/180; 83/914
[58] Field of Search ..................... 30/289, 180; 83/914

[56] References Cited

U.S. PATENT DOCUMENTS 3,398,613  8/1968  Gallotti ............................ 30/389 X

FOREIGN PATENT DOCUMENTS 5324 of 1893 United Kingdom ..................... 30/180
1442799 7/1976 United Kingdom ..................... 83/914

Primary Examiner—Jimmy C. Peters
Attorney, Agent, or Firm—Parmelee, Miller, Welsh & Kratz

[57] ABSTRACT

Apparatus for removing weld surplus formed after the aluminothermic welding of two rail butt ends, and incorporating a frame, a first cutting tool secured to the frame and a second cutting tool movable relative to the frame towards the first tool to remove the weld surplus. This apparatus is characterized by the fact that both tools have a cutting edge each with a profile suitable for cutting only the weld surplus on top of the rail head, and the second tool may either be moved horizontally and parallel or perpendicularly to the longitudinal axis of the rail by a hydraulic jack whose body is attached to the frame and whose ram is fixed to the second tool above its cutting edge.

7 Claims, 4 Drawing Figures

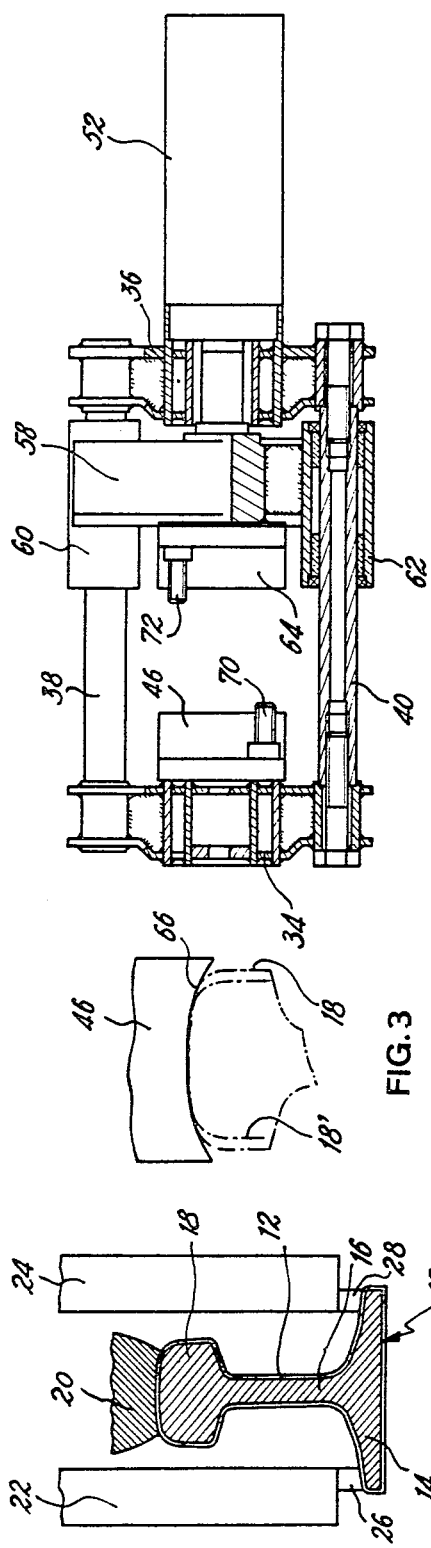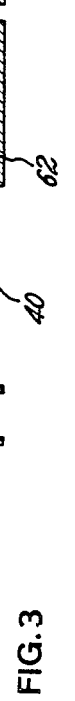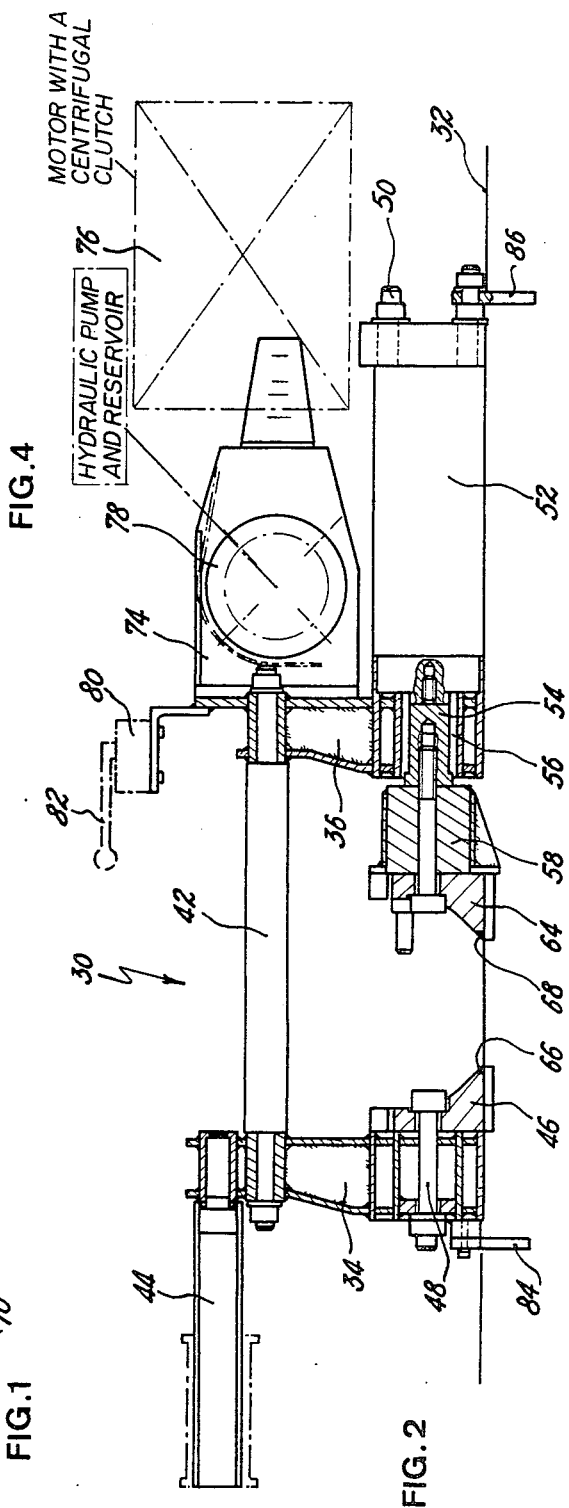

APPARATUS FOR REMOVING THE SURPLUS WELDING MATERIAL

This invention relates to apparatus for removing the surplus welding material formed after the aluminothermic welding of two rail butt ends.

After the aluminothermic welding of two rail butt ends, for instance rails for railway tracks, it is necessary to remove part at least of the surplus welding material formed at the joint of two welded butt ends.

The removal involves cutting off, while the weld is still hot, from the top of the rail head a deadhead approximately 3 to 4 cm high, and from the two sides of the rail head a welding rim approximately 5 mm thick. The removal involves immediately afterwards a grinding operation to conform the weld to the rail profile.

The cutting operation is usually effected by a chisel and sledge-hammer or a pneumatic cutter.

The major disadvantage of these traditional solutions is that they require high manual ability on the part of the operators if a correct cutting is to be achieved without damaging the rail.

It has also been proposed to carry out the cutting operation by means of apparatus incorporating one or two hydraulically operated cutting tools.

For instance, apparatus have already been proposed which incorporates a frame with an integral cutting tool and a movable cutting tool which moves horizontally in relation to the frame and parallel to the longitudinal axis of the rail, thus removing the welding surplus by bringing both tools together.

Such apparatus is suitable for removing the weld surplus from quite a large rail section, i.e. at least from the top and both sides of the rail head, but requires a very powerful hydraulic installation incorporating many control jacks for the movable tool and a fully independent motor unit, including generally a pump, pump motor and in some cases a pressure accumulator.

Such apparatus is large and heavy, which tends to hinder their maneuverability on site.

The object of the present invention aims is to obviate or mitigate the above disadvantages by providing such an apparatus which is particularly light in weight and relatively small thus facilitating transport to site while providing means for correctly cutting off the weld surplus.

To this end, the apparatus of this invention is designed to cut off the deadhead only, i.e. the weld surplus from the top of the rail head, the two rims located on either side of the rail head being eventually removed by grinding without requiring any preliminary cutting because of their small thickness.

According to the present invention, therefore, there is provided apparatus for removing the weld surplus formed after the aluminothermic welding of two rail butt ends, the apparatus incorporating a frame, a first cutting tool secured to the frame and a second cutting tool movable relative to the frame towards the first cutting tool to remove the weld surplus each tool having a cutting edge with a profile shaped to cut exclusively the weld surplus left on the rail head, and the second tool being movable in a direction selected from a direction horizontal and parallel to the longitudinal axis of the rail and a direction perpendicular to the longitudinal axis of the rail by a hydraulic jack attached to the frame and with its ram fixed to the second tool above its cutting edge.

In a preferable mode of operation, the second tool moves horizontally and in parallel to the longitudinal axis of the rail, the jack being arranged horizontally above the rail head, and parallel to the longitudinal axis of the rail.

For this mode of operation the apparatus incorporates two guide elements located at both ends of the frame and which sit astride the rail to ensure the correct positioning of the apparatus.

In an alternative mode of operation, the second tool moves horizontally and perpendicularly to the longitudinal axis of the rail, the jack being arranged horizontally above the rail head and perpendicularly to the longitudinal axis of the rail.

In both operating modes, the weld deadhead is removed by bringing both tools together thus acting as a pair of tongs.

The jack operating the second tool is controlled by a motor unit incorporating a hydraulic pump driven by a motor preferably through a centrifugal clutch.

Adjustable stops may be provided to limit the travel of the tools in order to keep a small clearance between the tool edges and avoid any contact between them and consequently any deterioration of the edges.

An embodiment of the present invention will now be described, by way of example, with reference to the accompanying drawing, in which:

FIG. 1 is a sectional view of a rail showing the weld surplus after an aluminothermic welding operation;

FIG. 2 is a part-sectional side view of the apparatus according to the invention;

FIG. 3 is a part sectional view of a rail and a cutting tool of the apparatus of FIG. 2; and FIG. 4 is a part sectional plan view of the apparatus of FIG. 2.

FIG. 1 shows the profile of a rail 10 around which there is some weld surplus from an aluminothermic welding operation after breaking the mould used for casting the fusion weld. This surplus includes a low thickness rim 12, called a 'projection', along both sides and below the rail sole 14, around both sides of the rail core or stem 16 and rail head 18. This surplus also includes a deadhead 20 connected to the rim 12 above the rail head 18. In addition, this surplus includes two cylinders 22 and 24 formed by the mould ducts in which the aluminothermic metal surplus is located.

It should be noted that in FIG. 1 both cylinders 22 and 24 are simply connected to the 'prosection' by bridges of material 26 and 28 so that both cylinders 22 and 24 may be easily broken off at the same time as the mould.

The apparatus of this invention may be used where cylinders 22 and 24 are only connected by bridges 26 and 28, without any connection, as may be the case in some moulds, to rim 12 because the horizontal bridges are located at the level of both rail head sides.

FIGS. 2 and 4 show the apparatus arranged horizontally over a rail where the reference datum, corresponding to the rail bed, is represented by straight line 32. The apparatus 30 incorporates a frame constituted by two triangular parts 34 and 36 connected at their bases by two horizontal and parallel guide bars 38 and 40 and at their tops by a support bar 42 parallel to bars 34 and 36. The triangular part 34 serves to mount a handle 44 for carrying the apparatus and a cutting tool 46 is secured to the triangular part 34 by means of bolt 48.

The body of a jack 52, arranged horizontally and parallel to the longitudinal axis of the rail, is secured by tie bolts 50 to the triangular part 36. The ram 54 of jack 52 passes through a cylindrical orifice 56 in the triangular part 36, and is secured, at its free end, to a movable assembly 58 which is mounted on and slides along guide bars 38 and 40. To this effect, the assembly 58 includes two sleeves 60 and 62 for sliding along the bars 38 and 40 respectively (see FIG. 4).

A movable cutting tool 64 is secured to the assembly 58 between the sleeves 60 and 62. The tools 46 and 64 are identical and have cutting edges 66 and 68 respectively for removing the deadhead 20 when the jack 52 brings both tools together. Because the jack 52 is above the rail head, the action point of the ram 54 is located at some distance above the cutting edge 68.

To prevent cutting edges 66 and 68 coming into contact at the end of their travel, tools 46 and 64 are provided with adjustable stops 70 and 72 respectively located at opposite sides of the tools and above the respective cutting edges. At the end of travel, stops 70 and 72 come respectively into contact with tools 64 and 46.

FIG. 3 shows the tool 46 applied to the top of rail head 18. It can be seen that the profile of the cutting edge 66 of tool 46 is so shaped as to remove only the deadhead located on top of head 18. It will be manifest that this profile is equally suitable for removing a deadhead from a rail head having a different profile. Consequently, the profile of cutting edge 66 is suitable for various types of rail sections, there being no need to change the cutting tool for every different type of welded rail section.

The jack 52 is operated by a hydraulic unit incorporating a hydraulic pump and reservoir attached to the housing 74 integral with the triangular part 36. The pump is driven by a motor, schematically shown at 76, by a belt running around pulley 78 integral with the pump shaft.

It has been found that use can be made advantageously of a low power motor or a 2-stroke motor, for instance a motor used for operating chain saws. In addition, their lightness and comparatively high power output in relation to their weight, offer the further advantage of incorporating a centrifugal clutch which enables the pump to be driven when the motor operates beyond a certain rating.

Since only a single jack is used and a force of approximately 10 tonnes only is required on the moving cutting tool to remove the deadhead, no pressure accumulator is required and it is therefore possible to use a simple gear-driven pump with an oil flow of 3 liters per minute and 200 bar pressure and a 2-stroke motor capable of developing 7 horsepower.

The pump is connected, by means of two pipes (not shown) to a distributor 80 which incorporates a 3-position hand lever. Distributor 80 is also connected to jack body 52 through two pipes (not shown). The three positions of the hand lever enable the operator to extend the jack ram or to retract it or to place it in neutral, i.e. immobilise it.

In addition, the apparatus incorporates two guide elements 84 and 86 attached respectively to triangular part 34 and the jack body 52 to locate the apparatus over the rail, thus ensuring its correct positioning. These guide elements are preferably width adjustable since they can then be adapted to the width of the rail head which has been welded.

The apparatus is used as follows:

After welding two rail butt ends by the aluminothermic process using a casting mould, the mould is broken simultaneously with the welding duct cylinders. With the weld still hot, the apparatus is placed over the rail head and parallel to the longitudinal axis of the rail in such a way that the guide elements 84 and 86 are astride the rail and the deadhead to be removed is located between the two tools 46 and 64. The motor is switched on, if this has not been done already, and the motor rating is increased to drive the pump. Immediately afterwards the distributor hand lever 82 is turned to the jack ram displacement position so as to bring tools 46 and 64 together which then operate as a pair of tongs to remove the weld deadhead. Immediately afterwards, the hand lever is turned to the ram retracting position.

The time required for completing this cutting operation is relatively short, approximately 30 seconds, thus providing sufficient time for the subsequent grinding operation, account being taken of the total time assigned to the weld surplus removing operations.

It is pointed out that the apparatus is particularly light since its maximum weight is of the order of 80 kg.

The travel of both cutting tools may alternatively be horizontal and perpendicular to the longitudinal direction of the rail. In this case, the apparatus framework must be provided with a support, preferably adjustable, to keep the apparatus in place and which can cooperate with, for instance, the rail sole.

The apparatus may be used for the laying and rebuilding of railway tracks.

What is claimed is:

1. Apparatus for removing of the weld surplus formed after the aluminothermic welding of two rail butt ends, the apparatus comprising a frame having two horizontal and parallel guide bars, a first cutting tool secured to the frame and a second cutting tool movable relative to the guide bars towards the first cutting tool to remove the weld surplus, each tool having a cutting edge with a profile shaped to cut exclusively the weld surplus left on the rail head, and the second tool being movable in a direction selected from a direction horizontal and parallel to the longitudinal axis of the rail and a direction perpendicular to the longitudinal axis of the rail by a hydraulic jack attached to the frame and with its ram fixed to the second tool above its cutting edge, and a hydraulic unit integral with said apparatus, said jack being operated by said hydraulic unit.

2. Apparatus according to claim 1, in which the second tool is movable horizontally and parallel to the longitudinal axis of the rail, the jack being arranged horizontally on top of the rail head and parallel to the longitudinal axis of the rail.

3. Apparatus according to claim 2, comprising two guide elements located at the frame ends for sitting astride the rail.

4. Apparatus according to claim 1, in which the second tool is movable horizontally and perpendicularly to the longitudinal axis of the rail, the jack being arranged horizontally above the rail head and perpendicularly to the longitudinal axis of the rail.

5. Apparatus according to claim 1, in which the jack is controlled by a hydraulic unit which incorporates a pump driven by a motor through a centrifugal clutch.

6. Apparatus according to claim 1, in which adjustable stops are provided to limit the travel of the tools in order to ensure a small clearance between the cutting edges of the tools.

7. Apparatus according to claim 6, in which the tools are identical and each has an adjustable stop located laterally above the cutting edge for contact with the other tool.

* * * * *